G. C. PLUMMER.
CONVERTIBLE BODY FOR VEHICLES.
APPLICATION FILED OCT. 21, 1912.
1,072,394.
Patented Sept. 2, 1913.
4 SHEETS—SHEET 1.
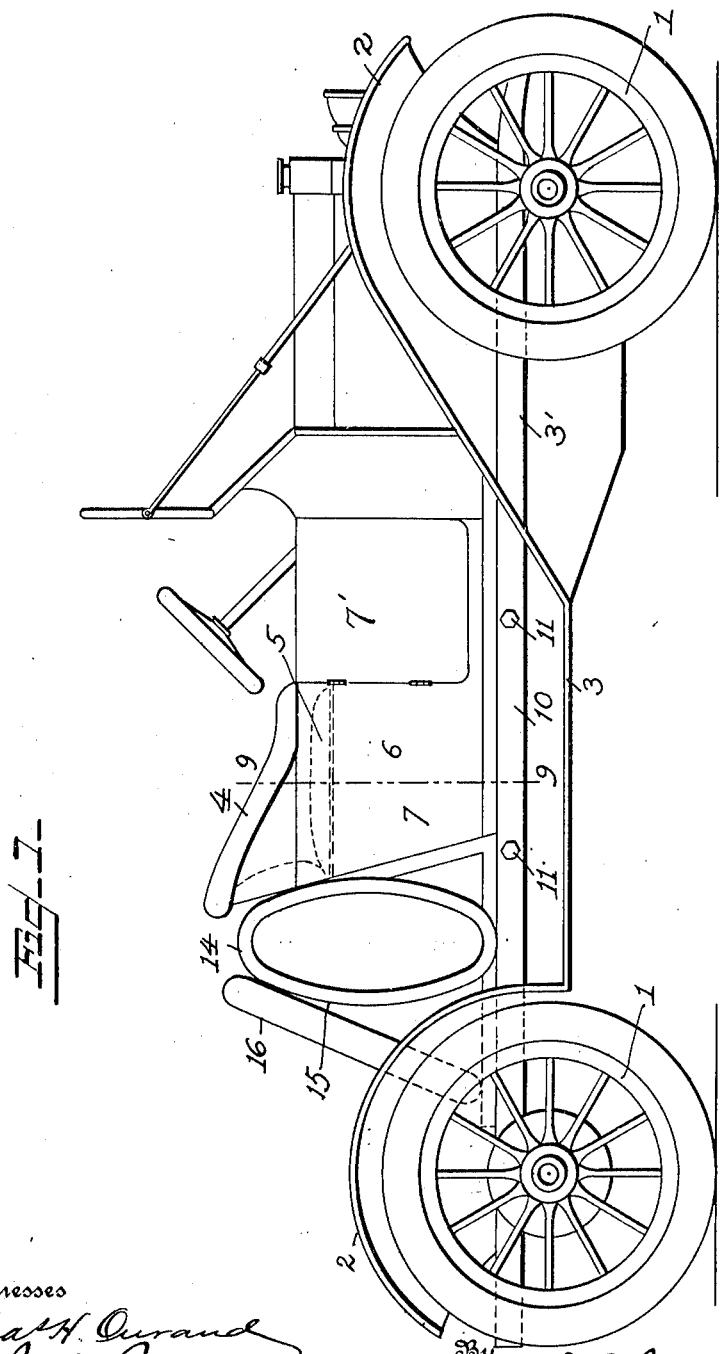

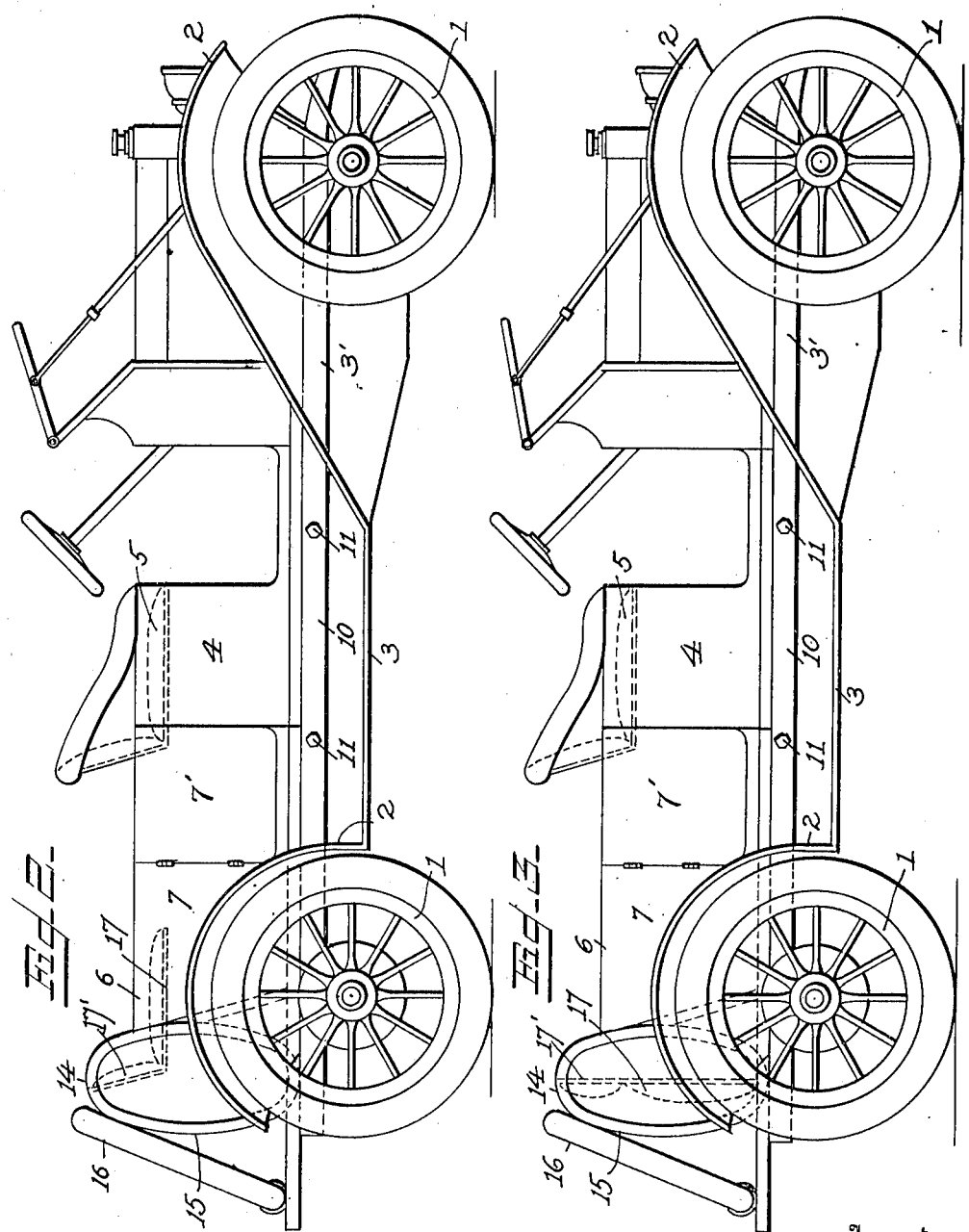

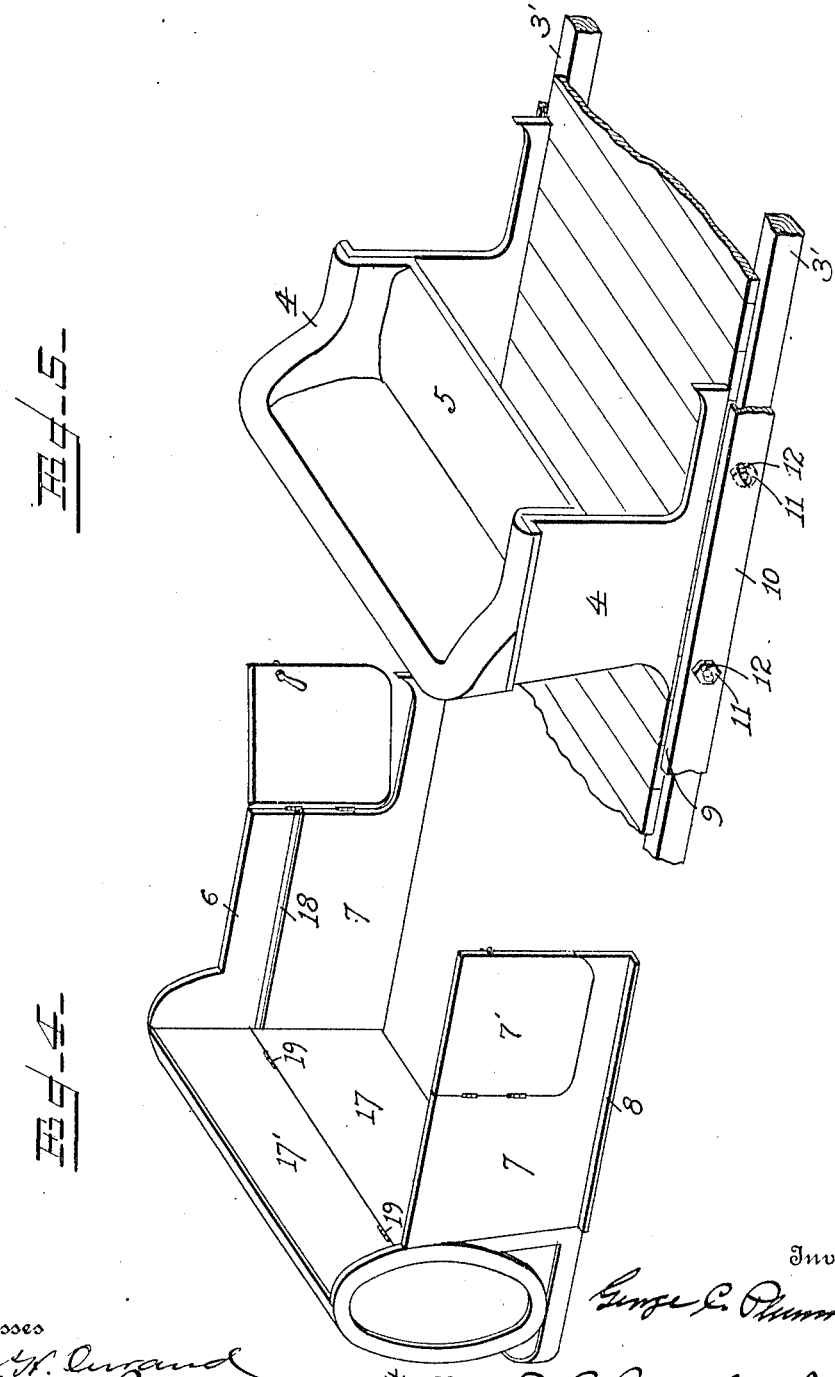

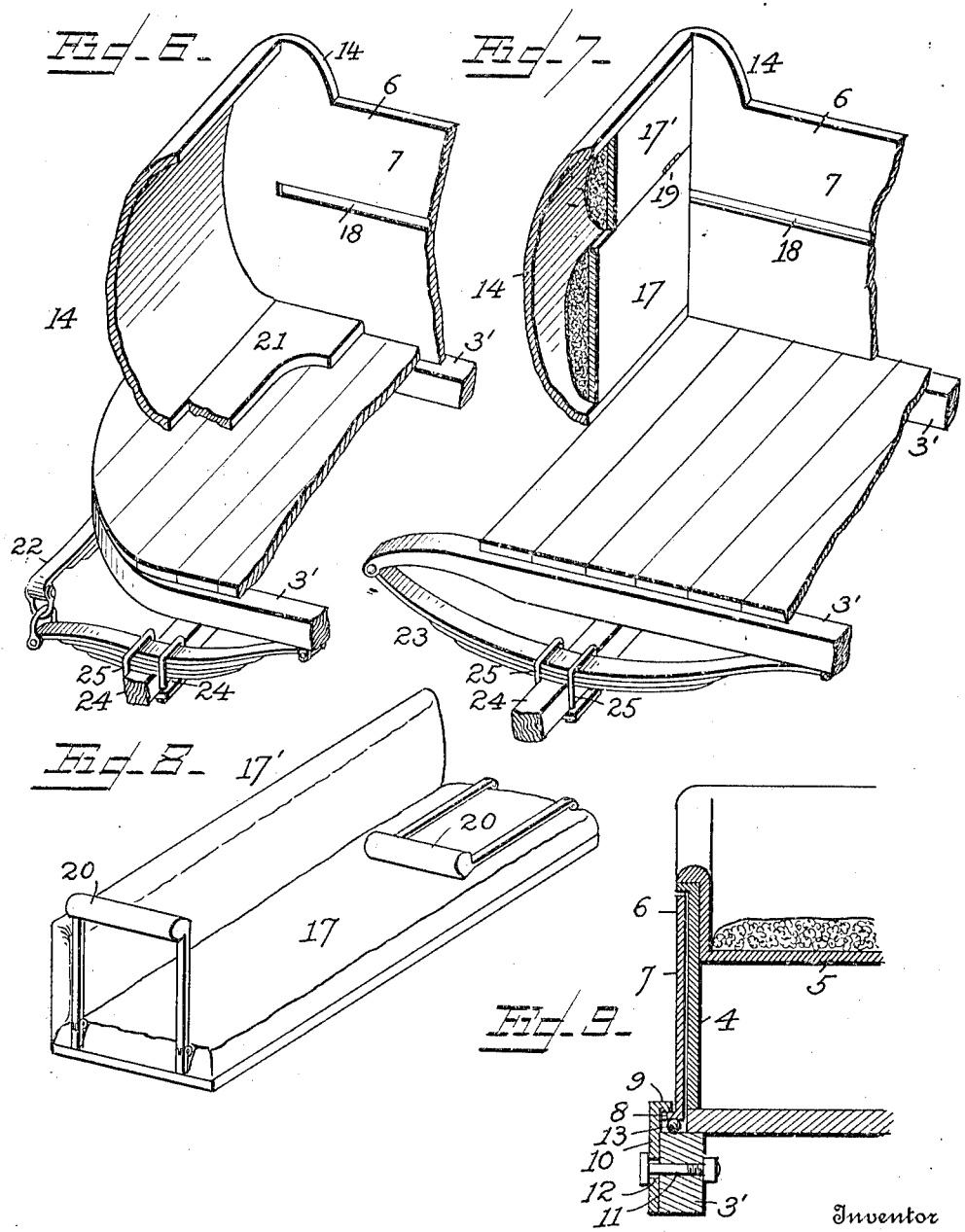

UNITED STATES PATENT OFFICE.

GEORGE C. PLUMMER, OF WASHINGTON, DISTRICT OF COLUMBIA, ASSIGNOR OF ONE-HALF TO FRANK E. PLUMMER, OF WASHINGTON, DISTRICT OF COLUMBIA.

CONVERTIBLE BODY FOR VEHICLES.

1,072,394. Specification of Letters Patent. Patented Sept. 2, 1913.

Application filed October 21, 1912. Serial No. 726,908.

*To all whom it may concern:*

Be it known that I, GEORGE C. PLUMMER, a citizen of the United States, residing at Washington, in the District of Columbia, have invented certain new and useful Improvements in Convertible Bodies for Vehicles; and I do hereby declare the following to be a full, clear, and exact description of the invention, such as will enable others skilled in the art to which it appertains to make and use the same.

My invention relates primarily to vehicles, has especial reference to automobiles, has for its object the construction of bodies for such vehicles, which are adapted for general utility, by making a roadster body which is adapted to be converted into a touring or five passenger car and also into a delivery car, whereby the car may be used as a one seated vehicle for traveling to and from business, a family or pleasure conveyance, and as a delivery car during business hours to deliver merchandise to customers, and again restored to a roadster for returning from business to home.

The invention consists in certain improvements which will be fully disclosed in the following specification and claims.

In the accompanying drawings, which form part of this specification:—Figure 1 represents a side elevation of my improved vehicle body applied to a conventional roadster, one seated or two passenger car. Fig. 2 is a like view showing the body extended and forming a two seated or five passenger touring car. Fig. 3 is a like view showing the seat of the rear section of the body folded and adapting the car for delivery purposes. Fig. 4 is an enlarged detail perspective showing part of the rear section of the body detached. Fig. 5 is a like view of the front section of the car. Fig. 6 is a like view of the rear section with the seat removed. Fig. 7 is a like view showing the seat turned up in position for a delivery vehicle. Fig. 8 is a detail perspective of the rear seat detached showing one of the ends or arms raised and the other folded down, and Fig. 9 is a vertical section on line 9—9 Fig. 1 through one side of the body.

Reference being had to the drawings and the designating characters thereon, the numeral 1 indicates the wheels, 2 the mud-guards, 3 the running-board, 3' the side members or bars of the chassis or running gear of a vehicle, all of which are of conventional form.

4 indicates the front or stationary member of the body, provided with a two passenger permanent seat 5.

6 indicates the rear or longitudinally movable or adjustable section, which is shown in closed or contracted position in Fig. 1 and in distended position in Fig. 2. This section is provided with conventional sides 7, 7, and doors 7' permanently attached thereto which telescope over the sides of the fixed member 4, as shown in Fig. 9, and both members rest on the side members 3'. The lower edge of each of the sides of the section 6 may be provided with a laterally extending flange 8, for a metal body, or an angle iron member may be substituted therefor in wooden bodies. The flange 8 is engaged by a flange 9 on a plate 10 which plate is secured to the members 3' by bolts 11 extending through elongated and slightly inclined slots 12, as shown in Figs. 5 and 9 to secure the rear member to the chassis. The front member may be secured to the members 3' by angle iron not shown, or in any preferred manner. The sides 7 of the section 6 may be supported upon ball-bearings 13 or on any preferred form of anti-friction bearings.

At the rear end of the section 6 is an elliptical member 14 having the end appearance of a gasolene tank. The rear portion 15 forms a rest for an extra tire 16, usually carried on an automobile. The front wall of this member is removed, and the seat 17 is placed in the member when not in use for passengers, as shown in Figs. 3 and 7. When the seat 17 is placed in position for passengers, the ends thereof rest on longitudinal horizontal cleats 18 in the sides 7. When the member 6 is extended and the seat properly positioned, a five passenger touring vehicle is produced, and when the seat is turned up in the member 14, it forms the rear end of a delivery compartment and the space between the front seat and the rear end of section 6 forms a convenient delivery vehicle for merchandise or the like, as shown in Fig. 3. When turned up, the seat may be secured by any suitable means.

For convenience of handling, the back 17' of the seat may be connected to the seat 17 by hinges 19, only one of which is shown in Fig. 7, pushed into the member 14, and when taken out for use the seat is reversed and placed in position on the cleats 18. On the ends of the seat are folding arms 20, 20. In Fig. 6 a filling piece 21 is shown for covering the rounded rear end of the bottom for a platform spring construction 22. In Fig. 7 an elliptical spring construction 23 is shown, in both instances the movable member 6 is shown with the side members 3' of the chassis, and the rear axle 24 connected to the spring, by clips 25. Suitable locking members, not shown, are used for securing the movable member 6 in both of its positions to prevent accidental longitudinal movement on the members 3' of the chassis.

It is obvious that changes in the details of construction may be made without departing from the spirit of my invention.

Having thus fully described my invention, what I claim is;

1. A convertible automobile body, comprising a fixed front section provided with a seat, and a rear section having conventional sides and doors in the sides, and a removable seat, and supported to slide on the chassis to telescope the front section, whereby the body is convertible from a roadster, into a delivery or a touring car.

2. An automobile body comprising a fixed front section and a longitudinally movable rear section provided with sides and doors in the sides, and each section having a seat for passengers, the seat of the rear section being removable and constructed to form the rear end of a delivery compartment, said rear section being slidably supported on the chassis and the body convertible from a roadster, into a delivery or a touring car.

3. A convertible automobile body comprising a fixed front section having a permanent seat, a rear section provided with conventional sides, doors in the sides and laterally extending flanges at the lower edges of the sides and slidable on the chassis, and members for securing said section to the chassis, and a removable seat for the rear section, constructed to form the rear end of said section, whereby the body is convertible from a roadster into a delivery or touring car.

In testimony whereof I affix my signature, in presence of two witnesses.

GEORGE C. PLUMMER.

Witnesses:
 D. C. REINOHL,
 W. PARKER REINOHL.

---

Copies of this patent may be obtained for five cents each, by addressing the "Commissioner of Patents, Washington, D. C."